United States Patent
Sakai et al.

(10) Patent No.: US 7,092,058 B2
(45) Date of Patent: Aug. 15, 2006

(54) METHOD AND APPARATUS FOR IMPARTING ALIGNMENT TO ALIGNMENT LAYER THROUGH GENERATION OF TWO KINDS OF POLARIZED LIGHT FROM A SINGLE LIGHT SOURCE AND TREATMENT WITH BOTH

(75) Inventors: Aki Sakai, Mobara (JP); Noboru Kunimatsu, Chiba (JP); Yoshitada Oshida, Chigasaki (JP)

(73) Assignee: Hitachi Displays, Ltd., Mobara (JP)

( * ) Notice: Subject to any disclaimer, the term of this patent is extended or adjusted under 35 U.S.C. 154(b) by 87 days.

(21) Appl. No.: 10/841,487

(22) Filed: May 10, 2004

(65) Prior Publication Data
US 2004/0257507 A1    Dec. 23, 2004

(30) Foreign Application Priority Data
May 9, 2003    (JP)    ............................. 2003-131486

(51) Int. Cl.
*G02F 1/1337*    (2006.01)
(52) U.S. Cl. ........................ 349/124; 349/123; 349/129
(58) Field of Classification Search ........ 349/123–124, 349/191
See application file for complete search history.

(56) References Cited

U.S. PATENT DOCUMENTS 6,696,114 B1 *  2/2004  Kawatsuki et al. .......... 428/1.2
2002/0012090 A1 *  1/2002  Lee et al. .................... 349/124

* cited by examiner

*Primary Examiner*—Andrew Schechter
*Assistant Examiner*—Phu Vu
(74) *Attorney, Agent, or Firm*—Antonelli, Terry, Stout and Kraus, LLP.

(57) ABSTRACT

It is possible to enhance the utilization efficiency of a light source and impart an orientation control performance and a pretilt angle to an orientation film in a short treatment time. Substrates to which orientation films are applied are mounted on stages which are sequentially transported to a main irradiation region and a sub-irradiation region. Light flux irradiated from a light source device having a single light source receives polarization treatment at a polarization unit, thus generating main polarized light and sub-polarized light. The main polarized light is irradiated to the orientation film formed on the substrate which is transported to a main irradiation region, thus imparting orientation control performance to the orientation film. Subsequently, the substrate is transported to a sub-irradiation region, and sub-polarized light is irradiated to the orientation film to which orientation control performance is already imparted, thus imparting a pretilt angle to the orientation film.

7 Claims, 12 Drawing Sheets

METHOD AND APPARATUS FOR IMPARTING ALIGNMENT TO ALIGNMENT LAYER THROUGH GENERATION OF TWO KINDS OF POLARIZED LIGHT FROM A SINGLE LIGHT SOURCE AND TREATMENT WITH BOTH

BACKGROUND OF THE INVENTION

The present invention relates to a method of manufacture and a device for the manufacture of a liquid crystal display device which impart optical anisotropy in a fixed direction to a surface of an orientation film formed of an organic polymer film or the like that is applied to a substrate by irradiating polarized light to a surface of the organic polymer film or the like.

As an example of a device which displays various images which contain still images or moving images, a liquid crystal display device has been popularly used. This type of liquid crystal display device basically includes a liquid crystal panel in which a liquid crystal layer is sandwiched between two substrates, wherein one substrate is made of transparent glass or the like. The liquid crystal panel is classified into a type in which given pixels are turned on and off by selectively applying voltages to various electrodes in pixels which are formed in a matrix array on the substrate of the liquid crystal panel and a type in which various electrodes forming pixels and active elements for selecting pixels are formed in a matrix array on the substrate of the liquid crystal panel, and the turning on and off of given pixels is effected by selecting the active elements. Particularly, the latter-type liquid crystal display device is referred to as an active matrix type liquid crystal display device, and it constitutes the most widely used liquid crystal display device in view of its excellent contrast performance, rapid display performance and the like.

The conventional active matrix type liquid crystal display device, depending on the difference in the method for controlling the orientation direction of the liquid crystal, is classified into a liquid crystal display device adopting a so-called vertical electric field method (also referred to as a TN method) in which the orientation direction of liquid crystal is controlled by generating an electric field by applying a voltage between pixel electrodes formed on one of two substrates and counter electrodes formed on another substrate, and a liquid crystal display device adopting a so-called lateral electric field method (also referred to as an IPS method) in which pixel electrodes and counter electrodes are formed on one of two substrates and the orientation direction of liquid crystal is controlled by forming an electric field in a direction substantially parallel to a surface of the substrate by applying voltages between the pixel electrodes and the counter electrodes.

As a typical example of the method which aligns liquid crystal molecules which constitute a liquid crystal layer in a given direction, an organic orientation film having the following constitution has been used. That is, the organic orientation film is constituted of an organic high molecular thin film, such as a polyimide-based film formed on the substrate, and a liquid crystal orientation control performance is imparted to the film by applying rubbing treatment to the film. Further, there also is a known technique which is referred to as optical orientation. In this technique, an orientation film which is formed of an organic high molecular thin film made of polyimide resin or the like is formed on a substrate, and a liquid crystal orientation control performance is imparted to the orientation film by the irradiation of light to the orientation film (for example, see U.S. Pat. No. 4,974,941 (literature 1), Japanese Patent Laid-Open No.34699/1993(literature 2), Japanese Patent Laid-Open No.281937/1994(literature 3), Japanese Patent Laid-Open No.247319/1995(literature 4).

Further, particularly, in the TN method, in addition to imparting of an orientation control performance to the orientation film, it is necessary to impart a so-called pretilt angle which causes the orientation axis of the liquid crystal molecules in a non-driven state to be tilted with respect to a surface of the substrate by a given angle. In the optical orientation technique which has been proposed conventionally, in general, first of all, when an orientation control performance is to be imparted to an orientation film, an optical orientation material is applied to the surface of a substrate, and a polarized light obtained by performing polarization treatment on a light flux from a light source using a first device is irradiated to the orientation film. Thereafter, using a second device in which a surface of the orientation film (the surface of the substrate) and the polarized light irradiating direction is arranged at an angle corresponding to the above-mentioned pretilt angle, polarized light is irradiated to the orientation film to impart a pretilt angle to the orientation film. Here, as an example of literature which discloses the related art relevant to imparting a pretilt angle to an orientation film using an optical orientation technique, see Japanese Patent Laid-Open No.142608/1998(literature 5).

SUMMARY OF THE INVENTION

As described above, in the conventional optical orientation technique using polarized light, an orientation control performance is imparted to an orientation film by irradiating linearly polarized light flux (ultraviolet rays) to the substrate on which the orientation film made of an optical orientation material is applied, and, subsequently, a pretilt angle is imparted to the orientation film by the irradiation of a light flux which has the polarization direction different from the polarization direction of the above-mentioned light flux, while changing the irradiation angle. Accordingly, the conventional optical orientation requires a double irradiation which uses two kinds of light fluxes consisting of a light flux for imparting the orientation control performance and a light flux for providing the pretilt angle, and, hence, a considerable time is required for performing these treatments. Further, it is necessary to separately install devices which perform two kinds of polarized light irradiations; and, hence, the substrate and transport system between the devices becomes complicated, and, further, only one polarized light (for example, p wave) is used as the polarized light which is obtained by performing the polarization treatment on light from the light source and which imparts the orientation control performance, and another polarized light (for example, s wave) is not used whereby the light from the light source is not effectively used.

Accordingly, it is an object of the present invention to provide a method of manufacture of a liquid crystal display device and a device for carrying out the manufacturing method, which to make it possible to impart the orientation control performance and a pretilt angle by treatment in a short period by enhancing the light utilization ratio of the light source employed for this purpose.

To achieve the above-mentioned object, for the purpose of solving the above-mentioned various drawbacks of the related art, the present invention adopts a method in which the orientation control performance is imparted to an orientation film that is applied to a substrate by irradiating one polarized light made up of two kinds of different polarized lights which are taken through polarization treatment of light from a single light source to the orientation film, and, at the same time, a pretilt angle is imparted to the orientation film to which the orientation control performance is imparted by irradiating another polarized light, which is generated by the polarization. treatment to the orientation film through an optical system. Due to such a constitution, it is possible to effectively utilize the light of the light source. Further, with respect to the substrate of a TN method liquid crystal display device, imparting of the orientation control performance and the pretilt angle to the substrate can be performed by one transfer of the substrate using a single light orientation device, and, hence, the treatment time can be shortened. On the other hand, with respect to the substrate of an IPS type liquid crystal display device, it is possible to shorten the treatment time of the orientation film, while enhancing the orientation control performance.

With respect to the imparting of the above-mentioned pretilt angle to the orientation film which is applied to the TN type liquid crystal display device after imparting the orientation control performance to the orientation film using the above-mentioned method, such imparting of the pretilt angle is determined by changing the irradiation angle of another polarized light to be irradiated by adjusting the angle of a stage which holds the substrate having the orientation film. Due to such an operation, the imparting of a given pretilt angle is facilitated.

Here, it is needless to say that the present invention is not limited to a TN type liquid crystal display device and is applicable to any liquid crystal display device which requires imparting of an orientation control performance and a pretilt angle. Further, with respect to imparting of the orientation control performance to the orientation film which is applied to the substrate of an IPS type liquid crystal display device, by adopting a constitution which re-irradiates also another polarized light taken out from the single light source device to the orientation film to which the orientation control performance is imparted using an optical system, the orientation control performance can be enhanced and the treatment time can be shortened as well.

Typical constitutions of the present invention are as follows. That is, a method of manufacture of a liquid crystal display device according to the present invention, which includes an orientation film applied to a substrate surface which is brought into contact with a liquid crystal layer and which imparts the orientation control performance and a pretilt angle to the orientation film, is characterized by following constitutions.

(1) A substrate to which the orientation film is applied is mounted on a stage which is sequentially transported to a main irradiation region and a sub irradiation region, two different kinds of polarized lights (a main polarized light and a sub polarized light) are generated by performing polarized treatment of a light flux irradiated from one light source device, an orientation control performance is imparted to the orientation film provided to the substrate which is transported to the main irradiation region by irradiating one (for example, the main polarized light) of the above-mentioned two different kinds of polarized lights to the orientation film, and subsequently, the substrate is transported to the sub irradiation region and a pretilt angle is imparted to the orientation film to which the orientation control performance is imparted by irradiating another (for example, the sub polarized light) of the above-mentioned two different kinds of polarized lights to the orientation film.

(2) The light fluxes of the above-mentioned two different kinds of polarized lights are arranged in parallel to each other and the main irradiation region and the sub irradiation region are arranged at an interval which corresponds to a transport-direction width of the substrate, and at the time of irradiating another polarized light out of the above-mentioned two different kinds of polarized lights, a substrate surface of the above-mentioned substrate which is transported to the sub irradiation region is tilted with respect to the light flux of another polarized light by an angle which corresponds to the pretilt angle.

(3) Further, the main irradiation region and the sub irradiation region are arranged close to each other by the transport-direction width of the substrate, the substrate is transported to the main irradiation region and the sub irradiation region sequentially in a direction orthogonal to the light flux of one polarized light of the above-mentioned two different kinds of polarized lights, the light flux of the other polarized light of the above-mentioned two different kinds of polarized lights is tilted with respect to the substrate by an angle corresponding to the pretilt angle in the sub irradiation region, and the irradiations of the one polarized light and the other polarized light are performed.

Further, a device for the manufacture of a liquid crystal display device, which includes an orientation film applied to a substrate surface which is brought into contact with a liquid crystal layer and with which orientation control performance and a pretilt angle are imparted to the orientation film, is characterized by the following constitutions.

(4) The manufacturing device includes:

a stage on which a substrate having the orientation film formed thereon is mounted, a stage transport control device which controls transporting of the stage and tilting of a substrate surface of the substrate which is mounted on the stage, and a polarized light irradiation device which irradiates a given polarized light to the orientation film formed on the substrate which is mounted on the stage, wherein the polarized light irradiation device includes a main irradiation region where the orientation control performance is imparted to the orientation film formed on the substrate and a sub irradiation region where a pretilt angle is imparted to the orientation film to which the orientation control performance is imparted in parallel in the transporting direction of the stage, a single light source device, a polarization unit which takes out two different kinds of polarized lights (a main polarized light and a sub polarized light) from a light flux irradiated from the light source device, first irradiation means which irradiates one (for example, the main polarized light) of the above-mentioned two different kinds of polarized lights taken out from the polarization unit to the orientation film formed on the substrate which is mounted on the stage and moves in the main irradiation region in the given direction, thus imparting an orientation control performance to the orientation film, and second polarized light irradiation means which irradiates another (for example, the sub polarized light) of the above-mentioned two different kinds of polarized lights taken out from the polarization unit to the orientation film formed on the substrate which is tilted with respect to the substrate surface of substrate which passes the main irradiation region and moves to the sub irradiation region by an angle which corresponds to the pretilt angle, wherein the orientation control performance and a given pretilt angle are imparted to the orientation film by allowing the substrate on which the orientation film is formed to pass through the main irradiation region and the sub irradiation region.

(5) The light source device includes a light source and a collimator lens which forms a light flux from the light source into parallel light along an optical axis of the light source, and the polarization unit includes:

a large number of polarization elements which are sequentially arranged at a rear stage of the collimator lens along the optical axis of the collimator lens and are tilted with respect to a light flux irradiated from the collimator lens by a Brewster's angle, wherein one or a plurality of polarization elements arranged close to the collimator lens have reflection surfaces which reflect the above-mentioned other polarized light, a first wavelength changing filter which changes a wavelength of the above-mentioned one polarized light which passes through the polarization element, a reflection mirror which reflects the above-mentioned other polarized light which is reflected on the polarization elements having the reflection surface in the direction substantially parallel to the above-mentioned one polarized light, a polarization direction changing wave plate which changes the polarization direction of the above-mentioned other polarized light which is reflected on the reflection mirror, and a second wavelength changing filter which changes a wavelength of the above-mentioned other polarized light which is reflected on the reflection mirror.

(6) Further, a device for the manufacture of a liquid crystal display device according to the present invention which includes an orientation film applied to a substrate surface which is brought into contact with a liquid crystal layer and with which orientation control performance and a pretilt angle are imparted to the orientation film, is characterized by including:

a stage on which a substrate having the orientation film formed thereon is mounted, a stage transport control device which controls transporting of the stage, and a polarized light irradiation device which irradiates a given polarized light to the orientation film formed on the substrate which is mounted on the stage, wherein the polarized light irradiation device includes a main irradiation region where the orientation control performance is imparted to the orientation film formed on the substrate and a sub irradiation region where a pretilt angle is imparted to the orientation film to which the orientation control performance is imparted in parallel in the transporting direction of the stage, a single light source device, a polarization unit which takes out a main polarized light and a sub polarized light from a light flux irradiated from the light source device, first irradiation means which irradiates the main polarized light taken out from the polarization unit to the orientation film formed on the substrate which is mounted on the stage and moves in the main irradiation region in the given direction, thus imparting an orientation control performance to the orientation film, and second polarized light irradiation means which irradiates the sub polarized light separated from the polarization unit to the orientation film formed on the substrate at an angle which corresponds to the pretilt angle with respect to the substrate surface of the substrate which passes through the main irradiation region and moves to the sub irradiation region, wherein the orientation control performance and a given pretilt angle are imparted to the orientation film by allowing the substrate on which the orientation film is formed to pass through the main irradiation region and the sub irradiation region.

(7) The light source device includes a light source and a collimator lens which forms a light flux from the light source into parallel light along an optical axis of the light source, and the polarization unit includes:

a large number of polarization elements which are sequentially arranged at a rear stage of the collimator lens along the optical axis of the collimator lens and which are tilted with respect to light irradiated from the collimator lens by a Brewster's angle, wherein one or a plurality of polarization elements arranged close to the collimator lens have reflection surfaces which reflect the sub polarized light, a first wavelength changing filter which changes a wavelength of the above-mentioned main polarized light which passes through the polarization element, a reflection mirror which reflects the sub polarized light which is reflected on the polarization elements having the reflection surface toward the orientation film formed on the substrate at an angle which corresponds to the pretilt angle, a polarization direction changing wave plate which changes the polarization direction of the sub polarized light which is reflected on the reflection mirror, and a second wavelength changing filter which changes a wavelength of the sub polarized light which is reflected on the reflection mirror.

It is needless to say that the present invention is not limited to the above-mentioned constitutions, and embodiments described later and various modifications are conceivable without departing from the technical concept of the present invention.

DETAILED DESCRIPTION OF THE INVENTION

Figure 1A:
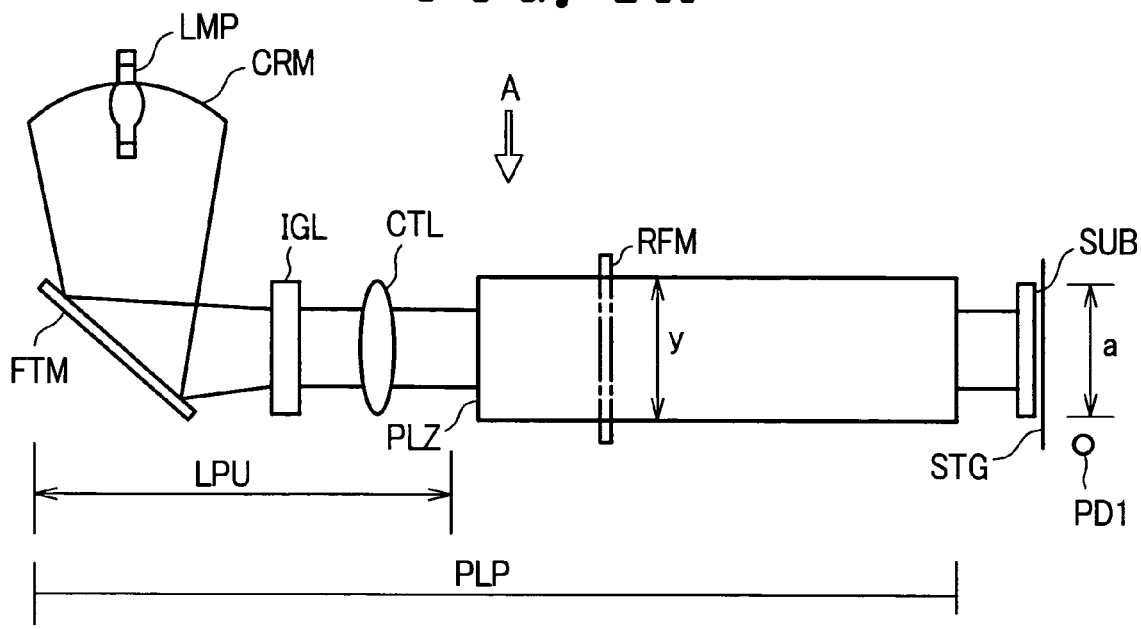
FIGS. 1A to 1C are diagrams which illustrate the features of a method of manufacture of a liquid crystal display device and a device for realizing the method according to the present invention.
Figure 1B:
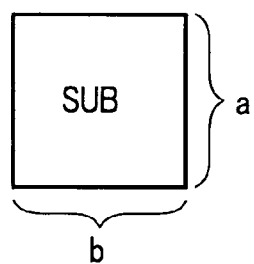
Figure 1C:
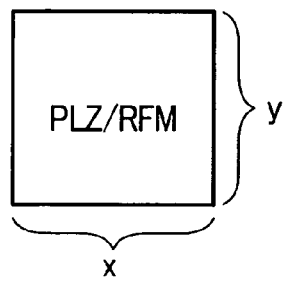
Figure 2:
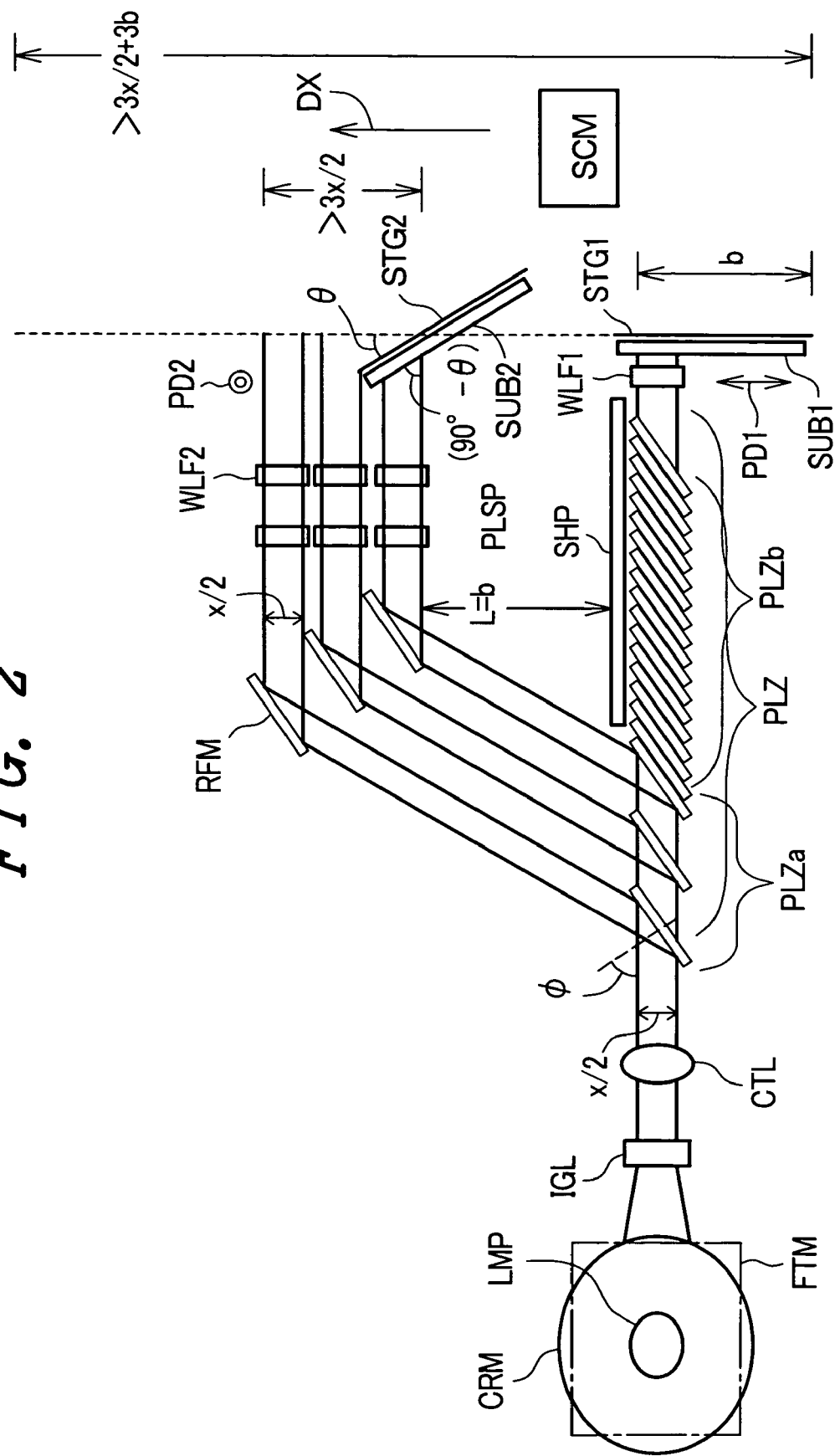
FIG. 2 is a diagram showing the detailed constitution of an optical system as viewed from the direction indicated by an arrow A in FIG. 1A.

Preferred embodiments of the present invention will be explained in detail in conjunction with the drawings. Hereinafter, the explanation is made by assuming the use of one of two different kinds of polarized lights, with one serving as a main polarized light and the other serving as a sub polarized light. FIG. 1A to FIG. 1C are showing a device for realizing the method of manufacture according to the present invention. In these drawings, FIG. 1A is a diagram of an optical system, FIG. 1B is a plan view of a substrate to which an orientation film is applied, and FIG. 1C is a plan view of a polarization element and a reflection mirror for reflecting the sub polarized light in the optical system shown in FIG. 1A. Further, FIG. 2 shows the detailed constitution of the optical system as viewed from the direction A in FIG. 1A for illustrating the first embodiment of the present invention. This embodiment is directed to a case in which the polarization direction and the orientation direction (the direction of the orientation control performance) are arranged in parallel.

In FIG. 1A, reference symbol PLP indicates a polarized light irradiation device, reference symbol SUB indicates a substrate to which the orientation film is applied, reference symbol STG indicates a stage on which the substrate SUB is mounted and which transports the substrate SUB. The polarized light irradiation device PLP is constituted of a light source device LPU and a polarization unit PLZ. The light source device LPU includes a light source (a mercury-arc lamp or the like) LMP, a focusing mirror CRM, a flat mirror FTM, an integrator lens IGL, and a collimator lens CTL. The polarization unit PLZ includes a reflection mirror RFM for making use of the sub polarized light.

In the substrate SUB to which the orientation film is applied, as shown in plan view in FIG. 1B, the size in one direction (a longitudinal direction in the drawing) is set to "a" and the size in the other direction (a lateral direction in the drawing) is set to "b". Further, as shown in plan view in FIG. 1C, with respect to the sizes of the polarization unit PLZ and the reflection mirror RFM, the size in one direction is set to "y" and the size in the other direction is set to "x".

Symbol "a" in FIG. 1A corresponds to the substrate size "a" in FIG. 1B, and symbol "y" in FIG. 1A corresponds to the size "y" of the reflection mirror RFM. In this embodiment, the relationship a<y is established. Hereinafter, the detailed structure of the constitution shown in FIG. 1A will be explained in conjunction with FIG. 2.

In FIG. 2, the polarization unit PLZ is constituted of one or a plurality of (here, three) polarization elements PLZa, which allow the main polarized light (here, p wave) to pass therethrough and reflect the sub polarized light (here, s wave), and a large number of polarization elements PLZb, which also allow the main polarized light to pass therethrough and reflect the sub polarized light. Three polarization elements PLZa are arranged at an interval which allows the reflected sub polarized light to pass. Since the other polarization elements PLZb do not make use of the reflected sub polarized light, these polarization elements PLZb are arranged close to each other. Due to such a constitution, by setting the number of polarization elements PLZa to three, it is possible to make use of approximately 55% of the reflected sub polarized light.

The polarization elements PLZa and PLZb are tilted with respect to an optical axis of light flux irradiated from the collimator lens CTL, which constitutes the light source device, at a Brewstar's angle $\phi$, and they have a size which includes a width x/2 of the light flux. Here, a light shielding plate SHP is provided for blocking the reflected sub polarized light which passes through the polarization element PLZb. The main polarized light which passes through the polarization elements PLZb is directed to the main irradiation region after passing through a wavelength changing filter WLF1. In the drawing, the polarization direction of the main polarized light PLZb is indicated by an arrow PD1 and the polarization direction of the sub polarized light is indicated by an arrow PD2.

The sub polarized light which is reflected on the polarization elements PLZa is reflected in the direction parallel to the optical axis of the main polarized light by the reflection mirror RFM and is directed to the sub irradiation region through a polarization direction change wave plate PLSP and a wavelength changing filter WLF2. In the drawing, the region where the stage STG1 is positioned defines the main irradiation region, and the region extending from the position where the irradiation of the sub polarization light starts defines the sub irradiation region. The interval L between the main irradiation region and the sub irradiation region is approximately equal to the size b of the substrate SUB.

The substrate SUB is transported from the main irradiation region to the sub irradiation region on a straight line indicated by a dashed line in the drawing in the transporting direction DX. In the sub irradiation region, the substrate SUB is tilted by an angle $\theta$ which is necessary for making the presence of the pretilt angle by the stage apparent. The width of the sub irradiation region in the transport direction is ">3x/2". Accordingly, the substrate transport distance for imparting the orientation control performance and the pretilt angle to the orientation film is ">(3x/2)+3b".

Figure 3:
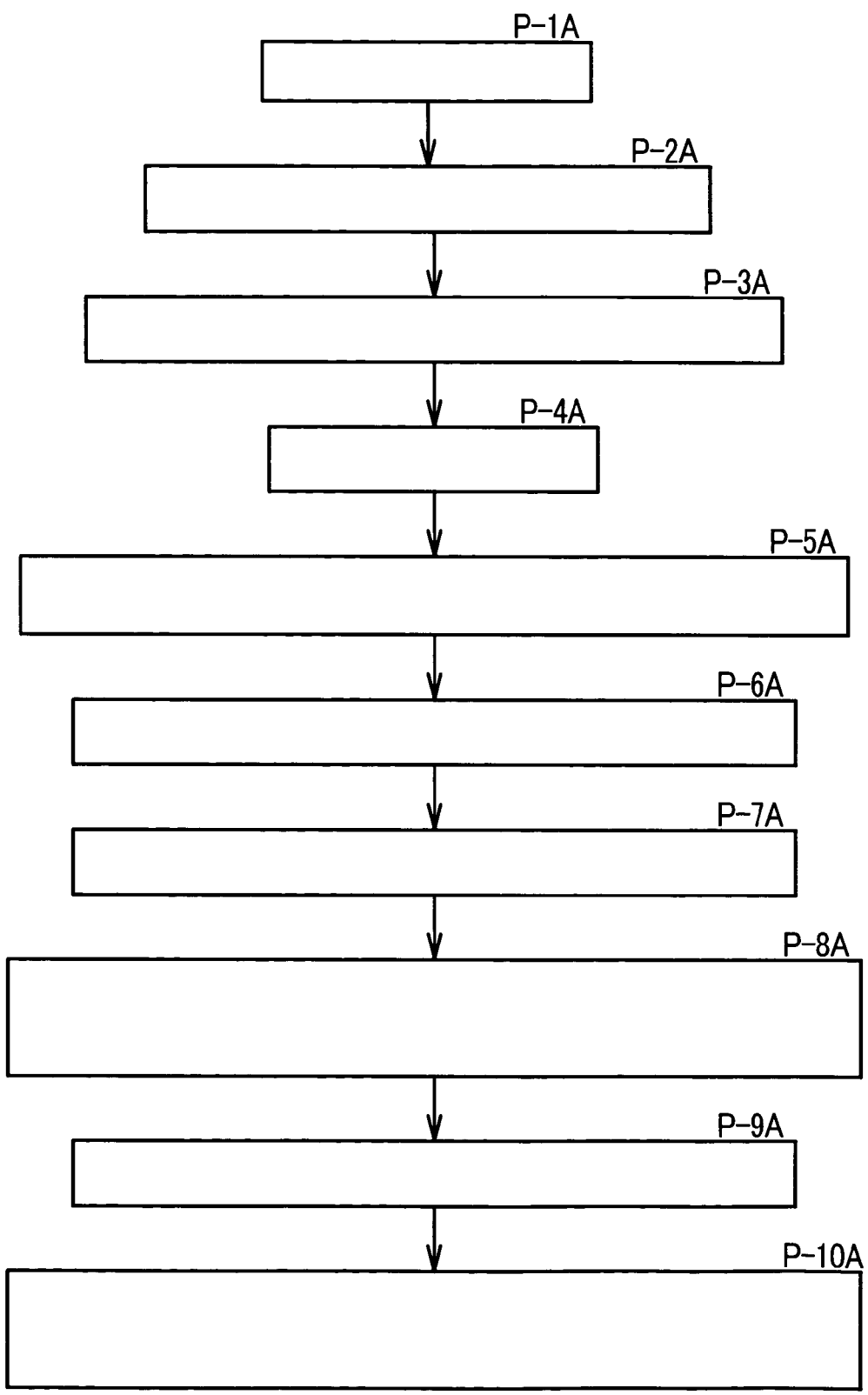
FIG. 3 is a flow chart of the method of manufacture of a liquid crystal display device according to the present invention.

FIG. 3 is a flow chart of a first embodiment of the method of manufacture of a liquid crystal display device according to the present invention. The manner of imparting the orientation control performance and the pretilt angle of this embodiment will be explained with reference to FIG. 2. In FIG. 3, the orientation film is applied to the substrate (P-1A), and the substrate is placed on the stage (P-2A). The stage is moved in the direction DX in FIG. 2 (=transporting (scanning) direction of the substrate) and is transported to the position of the stage STG1 in FIG. 2, that is, the main irradiation region (P-3A), and the irradiation of the main polarized light is started (P-4A). At a point of time at which the stage is moved in the direction DX by "b" (=size of the substrate SUB with respect to the direction DX)+x/2 (a width of light flux), the irradiation of the main polarized light is finished (P-5A).

Using a stage transport control device SCM, the stage which mounts the substrate SUB (at the position indicated by SUB1 in FIG. 2) to which the orientation control performance is imparted thereon is tilted by an angle θ necessary for imparting a given pretilt angle (an incident angle of a light flux of the sub polarized light, that is, an optical axis of the sub scanning angle=90° −θ, for example, θ=30°) (P-6A), is moved in the transport direction (direction DX) while holding the stage in a tilted state and is made to enter the sub irradiation region (P-7A). At a point of time at which the substrate SUB enters the irradiation region of the sub polarized light, the irradiation of the sub polarized light is started (P-8A). To enable the sequential processing of these series of operations, a plurality of stages with the substrates mounted thereon are moved at a fixed interval using a stage transport control device. At a point of time at which the stage is moved in the direction DX by bcosθ+x/2, the irradiation of the sub polarized light is finished (P-9A). The substrate which imparts the pretilt angle to the orientation film after imparting the orientation control performance to the orientation film is transported to another stage for the next treatment. The emptied stage is made to return to the initial position through a separate transport path, and, thereafter, the substrate to which an orientation film is applied is placed on the stage and is fed into the above-mentioned series of operations (P-10A). Accordingly, it is possible to arrange the main irradiation region and the sub irradiation region at an interval of one sheet of substrate, and, hence, it is possible to impart the orientation control performance and the given pretilt angle to the orientation film applied to the substrate by one transporting operation, whereby the throughput can be enhanced, while saving space.

Figure 4:
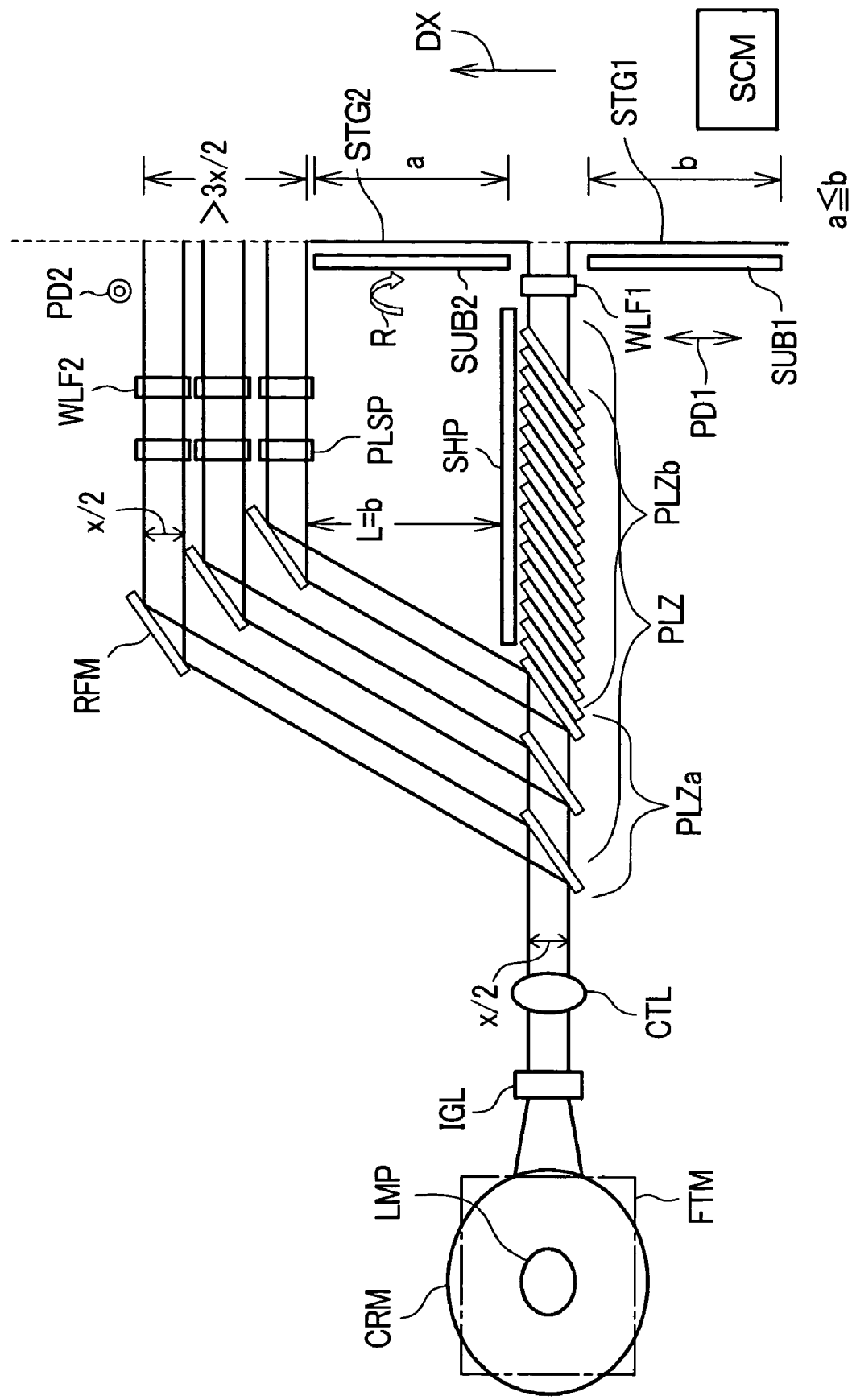
FIG. 4 is a diagram showing the detailed constitution of an optical system according to a second embodiment of the present invention.

FIG. 4 is a diagram showing the detailed constitution of an optical system according to a second embodiment of the method of manufacture of a liquid crystal display device of the present invention. This embodiment is directed to a case in which the polarization direction and the direction of the orientation control performance are orthogonal to each other. The layout of the whole device, including the optical system, is substantially equal to the constitution shown in FIG. 2, and the respective constitutions are also substantially equal to the corresponding constitutions in FIG. 2, and, hence, a repeated explanation thereof is omitted. This embodiment represents a case in which the polarization direction of the polarized light obtained by performing the polarization treatment of the light flux irradiated from the light source device and the orientation direction imparted to the orientation film are orthogonal to each other.

When the polarization direction of the polarized light and the orientation direction imparted to the orientation film are orthogonal to each other, the stage transport control device SCM finishes the irradiation of the main polarized light in the main irradiation region, inverts the longitudinal sides and the lateral sides of the substrate SUB by rotating the substrate to which the orientation control performance is imparted by 90°, allows the substrate to enter the sub irradiation region and, at the same time, is tilted by θ.

Figure 5:
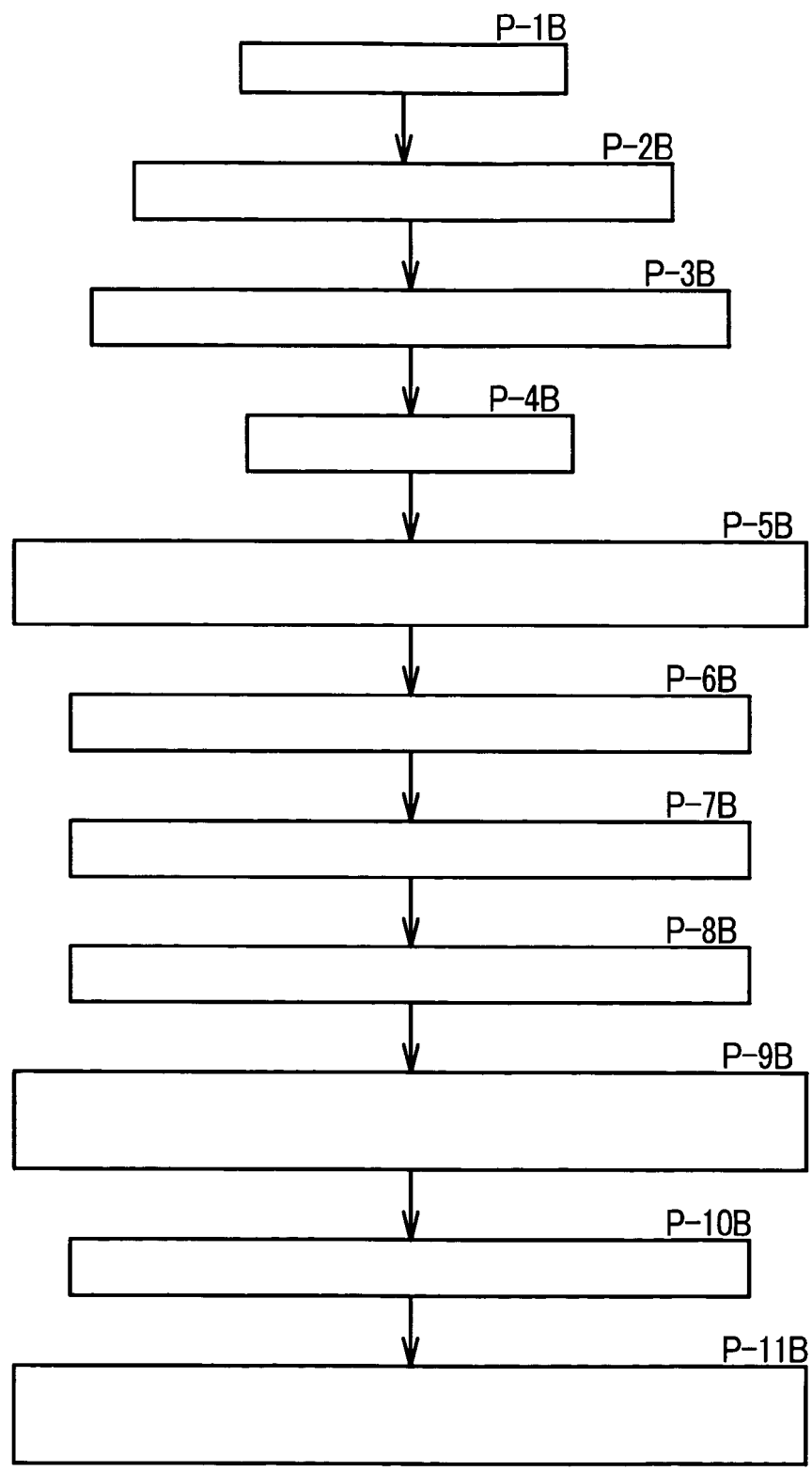
FIG. 5 is a flow chart of the second embodiment of the method of manufacture of a liquid crystal display device according to the present invention.

FIG. 5 is a flow chart of the second embodiment of the method of manufacture of a liquid crystal display device according to the present invention. The manner of imparting the orientation control performance and the pretilt angle of this embodiment will be explained with reference to FIG. 4. In FIG. 5, the orientation film is applied to the substrate (P-1B), and the substrate is placed on the stage (P-2B). The stage is moved in the direction DX in FIG. 4 (=transporting (scanning) direction of the substrate) and is transported to the position of the stage STG1 in FIG. 4, that is, the main irradiation region (P-3B), and the irradiation of the main polarized light is started (P-4B). At a point of time at which the stage is moved in the direction DX by "b" (=size of the substrate SUB with respect to the direction DX)+x/2 (a width of light flux), the irradiation of the main polarized light is finished (P-5B).

Using a stage transport control device SCM, the stage which mounts the 15 substrate SUB (at the position indicated by SUB2 in FIG. 2) to which the orientation control performance has been imparted is rotated about an optical axis of the main polarization (P-6B) by 90° (P-6B), and is tilted by an angle θ necessary for imparting a given pretilt angle (an incident angle of a light flux of the sub polarized light, that is, an optical axis of the sub scanning angle=90° −θ, for example, θ=30°) (P-7B). The stage is moved in the transporting direction (DX direction) while holding the stage in a tilted state and is made to enter the sub irradiation region (P-8B). At a point of time at which the substrate SUB enters the irradiation region of the sub polarized light, the irradiation of the sub polarized light is started (P-9B). At this point of time, in the main irradiation region, the irradiation of the main polarized light to the orientation film formed on the next substrate is started. To enable the sequential processing of these series of operations, a plurality of stages with the substrates mounted thereon are moved at a fixed interval using the stage transport control device. At a point of time at which the stage is moved in the direction DX by acosθ+x/2, the irradiation of the sub polarized light is finished (P-10B). The substrate which imparts the pretilt angle to the orientation film after imparting the orientation control performance to the orientation film is transported to another stage for the next treatment. The emptied stage is made to return to the initial position through a separate transport path, and, thereafter, a substrate to which the orientation film is applied is placed on the stage and is fed into the above-mentioned series of operations (P-11B). Accordingly, it is possible to arrange the main irradiation region and the sub irradiation region at an interval of one sheet of substrate, and, hence, it is possible to impart the orientation control performance and the given pretilt angle to the orientation film applied to the substrate by one transporting operation, whereby the throughput can be enhanced, while saving space.

Figure 6:
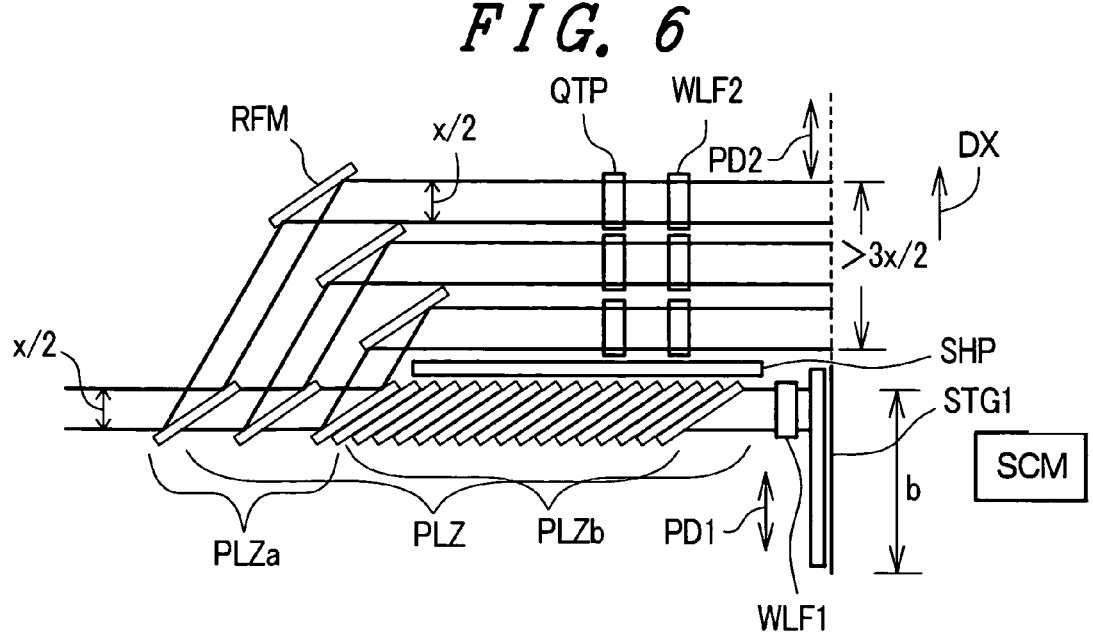
FIG. 6 is a diagram showing the detailed constitution of a main part of an optical system according to a third embodiment of the method of manufacture of a liquid crystal display device of the present invention.

FIG. 6 is a diagram showing the constitution of an optical system according to a third embodiment of the present invention. This embodiment a device for imparting an orientation control performance to the substrate which constitutes an IPS method liquid crystal display device. In principle, the imparting of a pretilt angle to the orientation film formed on the substrate which constitutes an IPS method liquid crystal display device is unnecessary. In this embodiment, the light of the light source can be efficiently utilized by also using the sub polarized light for imparting the orientation control performance.

Figure 7:
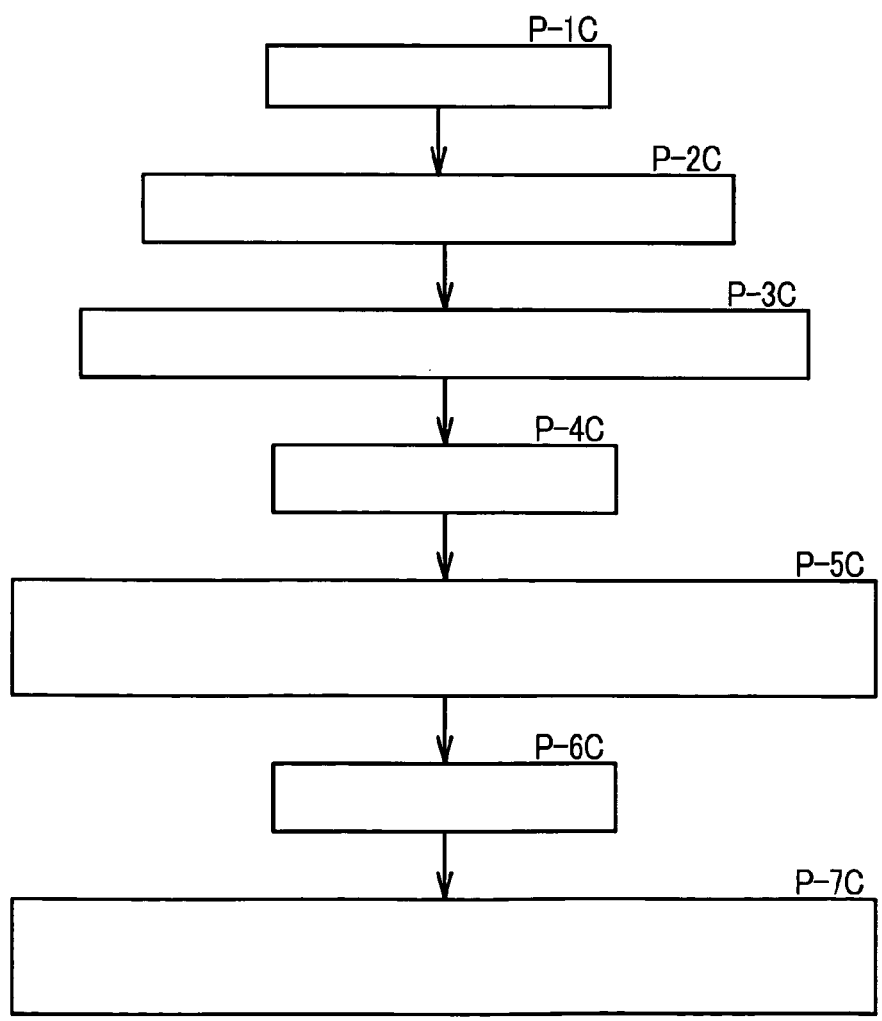
FIG. 7 is a flow chart of the third embodiment of the method of manufacture of a liquid crystal display device according to the present invention.

FIG. 7 is a flow chart of the third embodiment of the method of manufacture of a liquid crystal display device according to the present invention. The manner of imparting the orientation control performance according to this embodiment will be explained with reference to FIG. 6. In FIG. 7, an orientation film is applied to the substrate (P-1C), and the substrate is placed on the stage (P-2C). The stage is moved in the direction DX in FIG. 6 (=transporting (scanning) direction of the substrate) and is transported to the position of the stage STG1 in FIG. 6, that is, the main irradiation region (P-3C), and the irradiation of the main polarized light is started (P-4C). The sub irradiation regions are arranged close to each other at a minimum interval which can prevent the substrate SUB from overlapping the main irradiation region in the direction DX. At a point of time at which the stage is moved in the direction DX by x/2 (a width of light flux), the irradiation of the sub polarized light is started (P-5C). Here, the irradiation of the main polarized light is continued. Along with transporting the substrate, the irradiation of the sub polarized light is performed in parallel, and, hence, the orientation control performance is imparted to the orientation film due to the radiation of the sub polarized light. At a point of time at which the sub polarized light is irradiated to the whole region of the orientation film formed on the substrate, the irradiation of the sub polarized light is finished (P-6C).

The substrate to which the orientation control performance is already imparted is transported to another stage for the next treatment. The emptied stage is made to return to the initial position through a separate transport path; and, thereafter, the substrate to which the orientation film is applied is placed on the stage and is fed into the above-mentioned series of operations (P-7C). Here, succeeding the substrate which is transported while receiving the irradiation of the sub polarized light, the next substrate enters the main irradiation region and receives the irradiation of the main polarized light. Accordingly, it is possible to arrange the main irradiation region and the sub irradiation region at a minimum interval such that the substrates are not overlapped relative to each other, and, hence, it is possible to impart an orientation control performance to the orientation film applied to the substrate using the main and the sub polarized lights, whereby the utilization efficiency of light from the light source is enhanced. Further, since the orientation control performance can be imparted in one transporting movement, the throughput also can be enhanced, while saving space.

Figure 8:
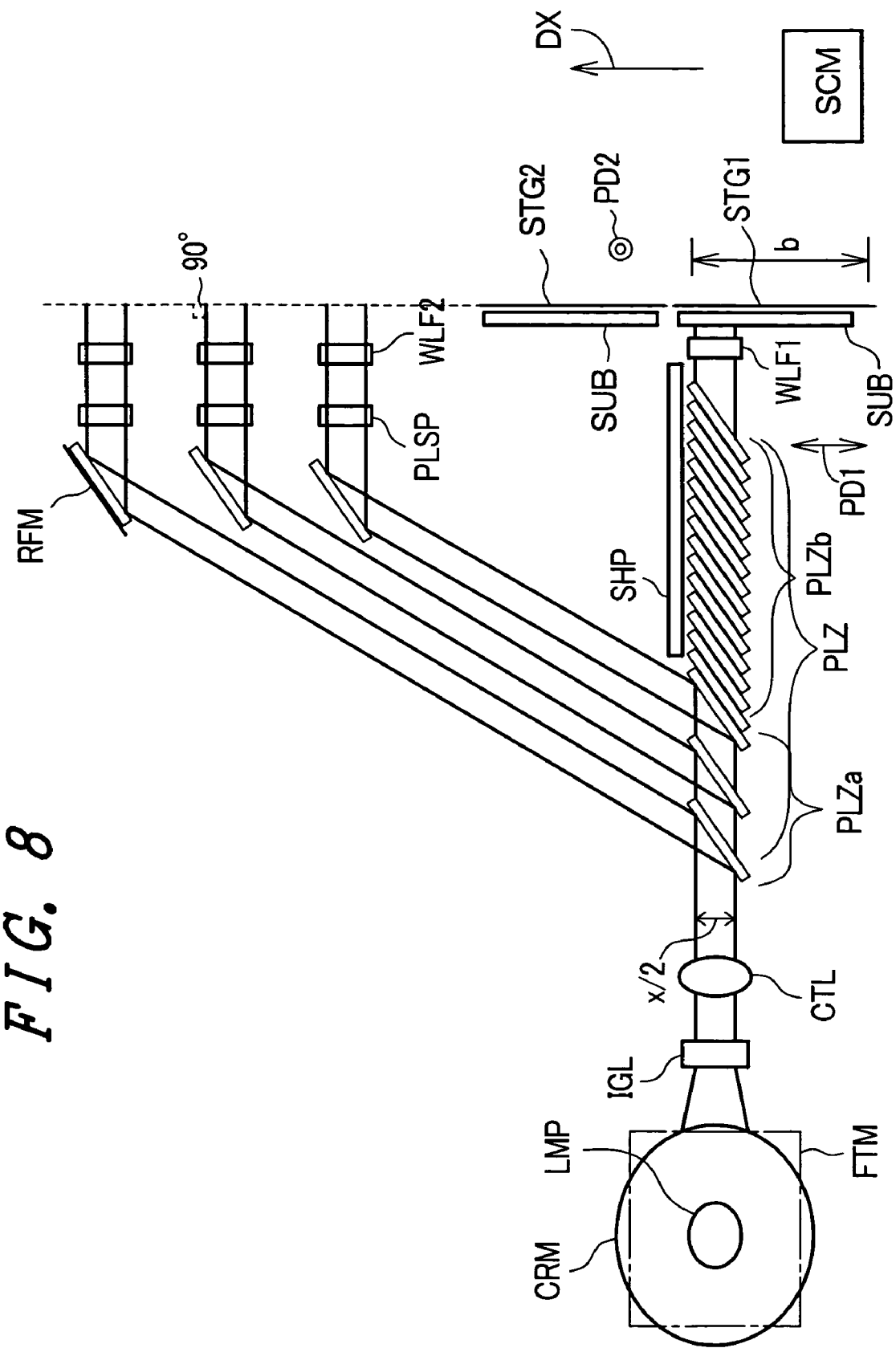
FIG. 8 is a diagram showing the detailed constitution of an optical system according to a fourth embodiment of the method of manufacture of a liquid crystal display device of the present invention.

FIG. 8 is a diagram showing the detailed constitution of an optical system in the same manner as FIG. 2, according to a fourth embodiment of the present invention. This embodiment is directed to a case in which the direction of the polarization and the direction of the orientation control performance are in parallel to each other, wherein the angle at which the sub polarized light is irradiated to the orientation film formed on the substrate is adjusted by an optical system. The layout of the whole device is substantially the same as the corresponding layout shown in FIG. 2, and the respective constitutions are also substantially the same as those constitutions shown in FIG. 2, and so a repeated explanation thereof is omitted. In this embodiment, the angle of the reflection mirror RFM is arranged to become orthogonal to the substrate to which the sub polarized light is irradiated.

Figure 9:
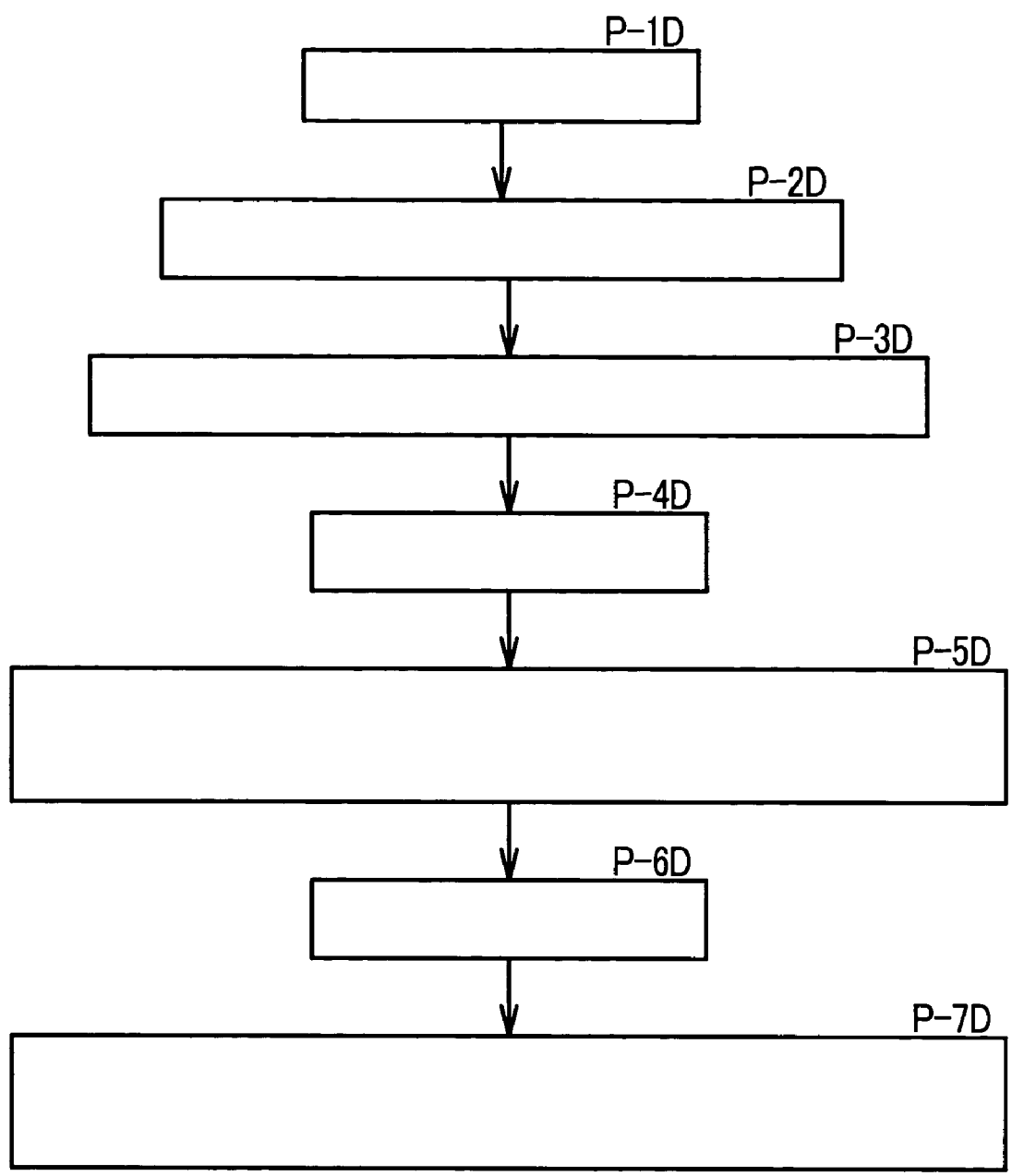
FIG. 9 is a flow chart of the fourth embodiment of the method of manufacture of a liquid crystal display device according to the present invention.

FIG. 9 is a flow chart of the fourth embodiment of the method of manufacture of a liquid crystal display device according to the present invention. Hereinafter, the manner of imparting the orientation control performance according to this embodiment will be explained with reference to FIG. 8. In the process of FIG. 9, the orientation film is applied to the substrate (P-1D), and the substrate is placed on the stage (P-2D). The stage is moved in the direction DX, as seen in FIG. 8(=transporting (scanning) direction of the substrate), and is transported to the position of the stage STG1 in FIG. 8, that is, the main irradiation region (P-3D), and the irradiation of the main polarized light is started (P-4D). The substrate is moved in the DX direction and the irradiation of the sub polarized light is started (P-5D). The moving distance is determined based on the distance between the polarization element PLZa which is closest to the substrate and the substrate (Assuming the distance between the polarization element PLZa which is closest to the substrate and the substrate is L, $\sqrt{3}/2$ becomes the moving distance). A series of operations are sequentially performed and the interval between the stages is set to a minimum interval to prevent the substrates from being overlapped relative to each other. By performing the irradiation of the sub polarized light while transporting the substrate, the orientation control performance is imparted due to the irradiation of the sub polarized light. At a point of time at which the sub polarized light is irradiated to the whole region of the orientation film formed on the substrate, the irradiation of the sub polarized light is finished (P-6D).

The substrate to which the orientation control performance is imparted is transported to another stage for the next treatment. The emptied stage is made to return to the initial position through a separate transport path, and, thereafter, the substrate to which the orientation film is applied is placed on the stage and is fed into the above-mentioned series of operations (P-7D). Here, succeeding the substrate which is transported while receiving the irradiation of the sub polarized light, the next substrate enters the main irradiation region and receives the irradiation of the main polarized light. Accordingly, it is possible to impart an orientation control performance and a pretilt angle to the orientation film formed on the substrate, whereby the utilization efficiency of light from the light source is enhanced. Further, since the orientation control performance can be imparted in one transporting movement, the throughput also can be enhanced, while saving space.

Figure 10:
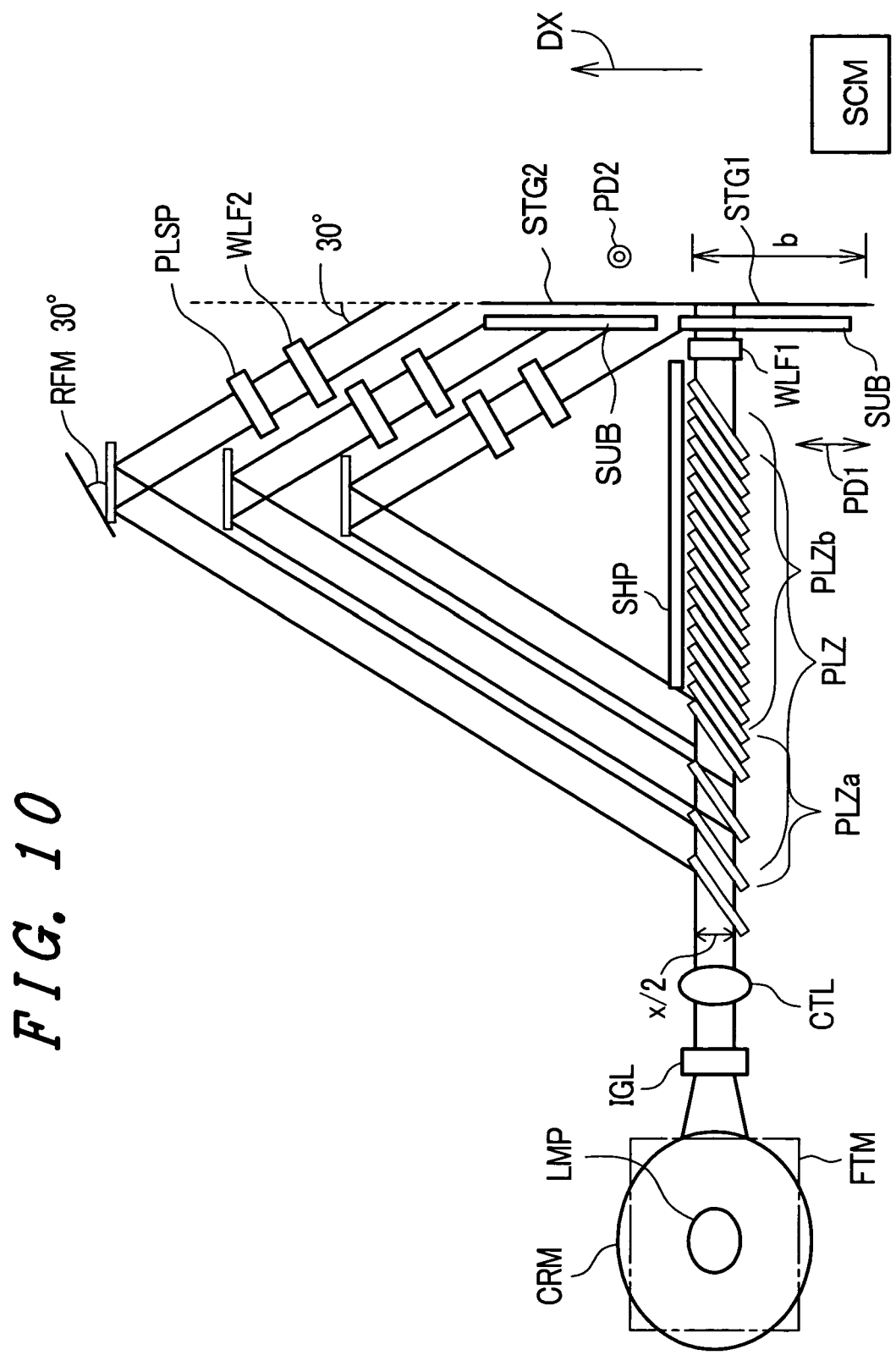
FIG. 10 is a diagram showing the detailed constitution of an optical system according to a fifth embodiment of the method of manufacture of a liquid crystal display device of the present invention.

FIG. 10 is a diagram showing the detailed constitution of an optical system, in the same manner as FIG. 8, according to a fifth embodiment of the present invention. This embodiment is directed to a case in which the direction of the polarization and the direction of the orientation control performance are in parallel to each other, wherein the angle at which the sub polarized light is irradiated to the orientation film formed on the substrate is adjusted by an optical system. The layout of the whole device is substantially the same as the corresponding layout shown in FIG. 8, and the respective constitutions are also substantially the same as those constitutions shown in FIG. 8, and so a repeated explanation thereof is omitted. In this embodiment, the angle of the reflection mirror RFM is arranged to assume an angle (30 degree in this embodiment) which corresponds to the pretilt angle, with respect to the substrate, to which the sub polarized light is irradiated.

Figure 11:
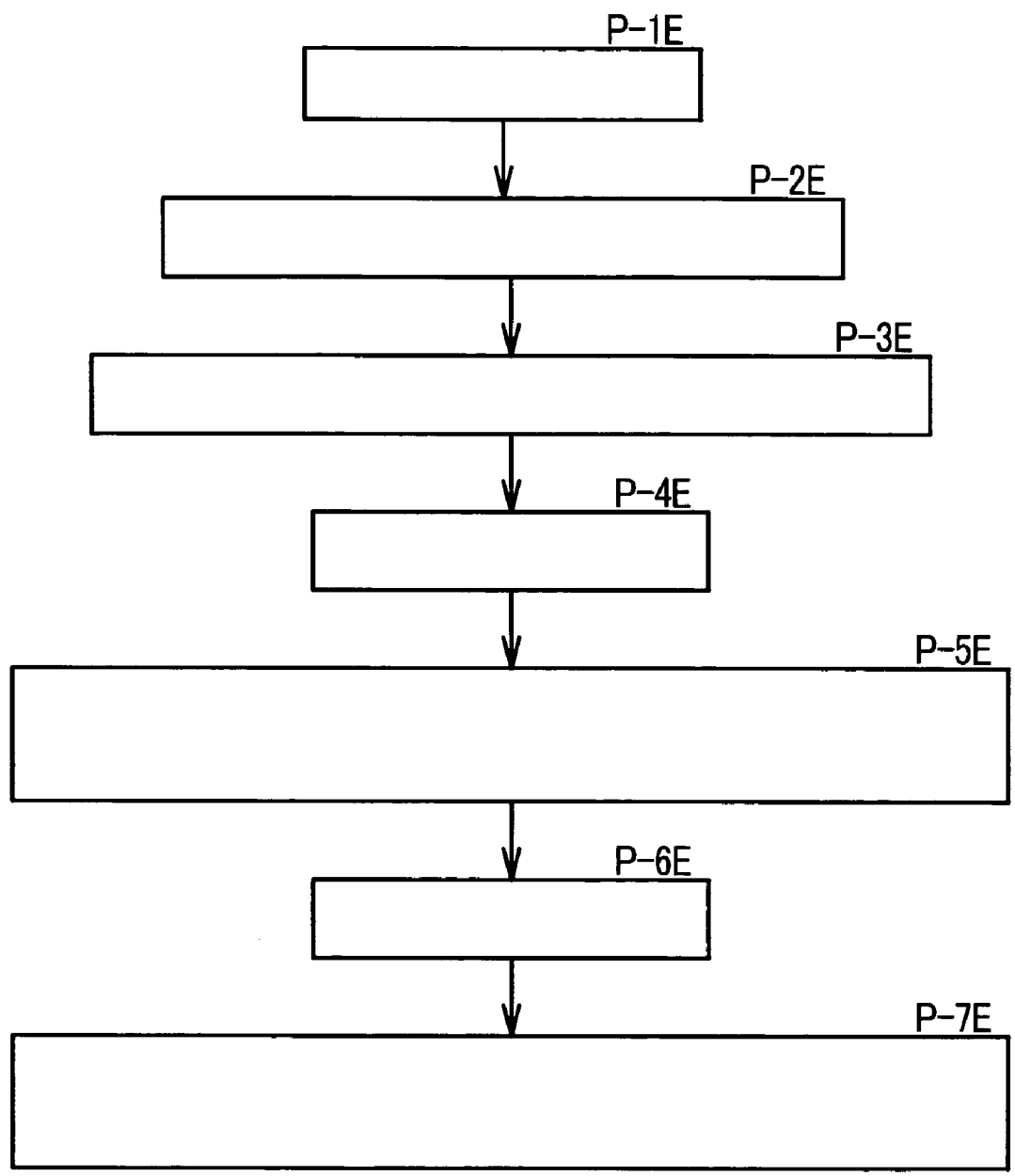
FIG. 11 is a flow chart of the fifth embodiment of the method of manufacture of a liquid crystal display device according to the present invention.

FIG. 11 is a flow chart of the fifth embodiment of the method of manufacture of a liquid crystal display device according to the present invention. Hereinafter, the manner of imparting the orientation control performance according to this embodiment will be explained with reference to FIG. 10. In the process of FIG. 11, the orientation film is applied to the substrate (P-1E), and the substrate is placed on the stage (P-2E). The stage is moved in the direction DX, as seen in FIG. 10(=transporting (scanning) direction of the substrate), and is transported to the position of the stage STG1 in FIG. 10, that is, the main irradiation region (P-3E), and the irradiation of the main polarized light is started (P-4E). At a point of time at which the substrate is moved in the DX direction, the irradiation of the sub polarized light is started (P-5E). A series of operations are sequentially performed, and the interval between the stages is set to a minimum interval to prevent the substrates from being overlapped relative to each other. By performing the irradiation of the sub polarized light while transporting the substrate (P-5E), an orientation control performance is imparted due to the irradiation of the sub polarized light(P-6E).

The substrate to which the orientation control performance is imparted is transported to another stage for the next treatment. The emptied stage is made to return to the initial position through a separate transport path, and, thereafter, the substrate to which the orientation film is applied is placed on the stage and is fed into the above-mentioned series of operations (P-7E). Here, succeeding the substrate which is transported while receiving the irradiation of the sub polarized light, the next substrate enters the main irradiation region and receives the irradiation of the main polarized light. Accordingly, it is possible to impart an orientation control performance and a pretilt angle to the orientation film formed on the substrate, whereby the utilization efficiency of light from the light source is enhanced. Further, since the orientation control performance and the pretilt angle can be imparted in one transporting movement, the throughput also can be enhanced, while saving space.

Here, the specific advantageous effects brought about by the wavelength change filters WLF1, WLF2 used in the respective embodiments of the present invention will be explained. Here, the polarization direction change wave plate PLSP and the wavelength changing filter WLF2 are combined depending on the properties of the materials or the like.

In imparting the orientation control performance and the pretilt angle to a TN method liquid crystal display device, a mercury-arc lamp is used as the light source of the light source device. When an absorption spectrum of the material of the orientation film to be used is present in the vicinity of 250 to 300 nm, it is possible to efficiently impart the pretilt angle to the orientation film by irradiating the polarized light formed of such light to the orientation film or by irradiating the light having the absorption spectrum in the vicinity of 300 to 400 nm to the orientation film. To efficiently use two different kinds of polarized light and to remove light having a wavelength other than the efficient wavelength, a wavelength changing filter which cuts out components of 300 nm or more is used with respect to the light flux of the main polarized light, and a filter which cuts out components of less than 300 nm is used with respect to the light flux of the sub polarized light. Since the light for imparting the orientation control performance to the orientation film and the light for imparting the pretilt angle to the orientation film differ in expected advantageous effects, two kinds of light can be easily generated using these filters.

Also, in imparting the orientation control performance to an IPS method liquid crystal display device, when an absorption spectrum of the material of the orientation film to be used is present in the vicinity of 250 to 300 nm, it is possible to efficiently impart the orientation control performance to the orientation film by irradiating the polarized light formed of such light to the orientation film or by irradiating the light having the absorption spectrum in the vicinity of 300 to 400 nm to the orientation film. To efficiently use two different kinds of polarized light and to remove light having a wavelength other than the efficient wavelength, the wavelength changing filter which cuts out components of 300 nm or more is used with respect to the light flux of the main polarized light, and the filter which cuts out components of less than 300 nm is used with respect to the light flux of the sub polarized light.

Figure 12:
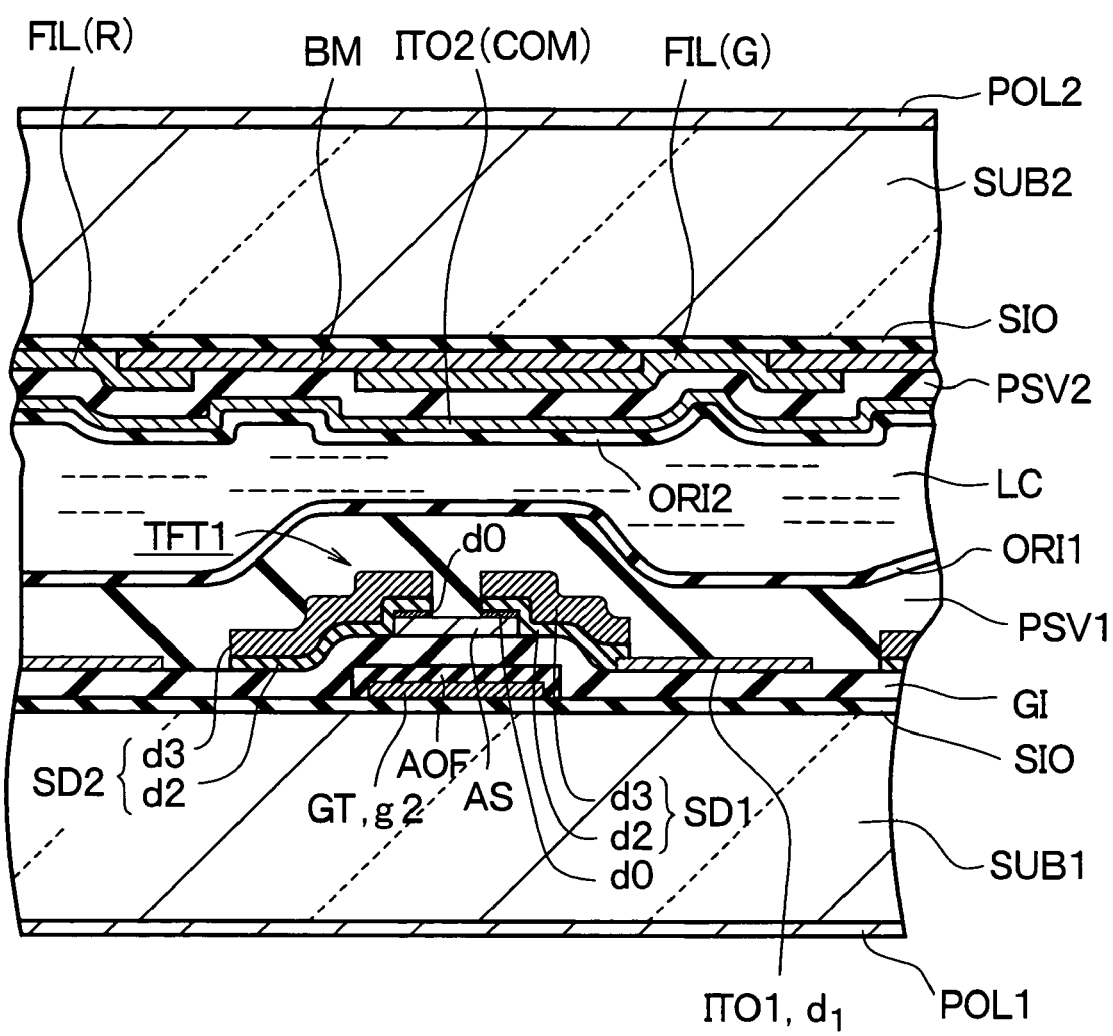
FIG. 12 is a cross-sectional view of a representative part of the liquid crystal display device manufactured by the manufacturing method of the present invention.

FIG. 12 is a cross-sectional view showing a representative part in one example of the liquid crystal display device manufactured by the manufacturing method of the present invention. This liquid crystal display device is a TN method type of liquid crystal display device, wherein orientation films OR1, OR2 are applied to respective inner surfaces of a first substrate SUB1 having thin film transistors TFT and a second substrate SUB2 having color filter layers, and these orientation films OR1, OR2 are brought into contact with a liquid crystal layer LC.

The first substrate SUB1 includes gate electrodes GT of thin film transistors TFT, a gate insulation layer GI, silicon semiconductor layers SI, drain electrodes SD2, source electrodes SD1, pixel electrodes ITO1 which are connected to the source electrodes SD1 and a passivation layer PSV1. Further, the orientation film ORI1 is applied to an upper layer of the passivation layer PSV1 and the orientation control performance and the pretilt angle are applied to the orientation film ORI1 due to the above-mentioned irradiation of the polarized light. Here, in FIG. 12, reference symbols d0, d1, d2, d3 indicate conductive layers which constitute respective electrodes, and reference symbol AOF indicates an anodic oxide film formed on a surface of the gate electrode.

On the other hand, to an inner surface of the second substrate SUB2, three color filters FIL(R), FIL(G) and FIL(B) of three colors, which are defined by a light shielding layer (a black matrix) BM, are applied. Over the color filters FIL(R), FIL(G) and FIL(B), a passivation layer PSV2 and a common electrode IT02 are formed. The orientation film ORI2 is applied to the second substrate SUB2 such that the orientation film ORI2 covers the common electrode IT02 (COM) and the orientation control performance and the pretilt angle are imparted to the orientation film ORI2 due to the above-mentioned irradiation of the polarized light. Here, the color filter FIL(B) is not shown in the drawing. Further, on outer surfaces of the first substrate SUB1 and the second substrate SUB2, polarizers POL1, POL2 are respectively stacked.

Figure 13:
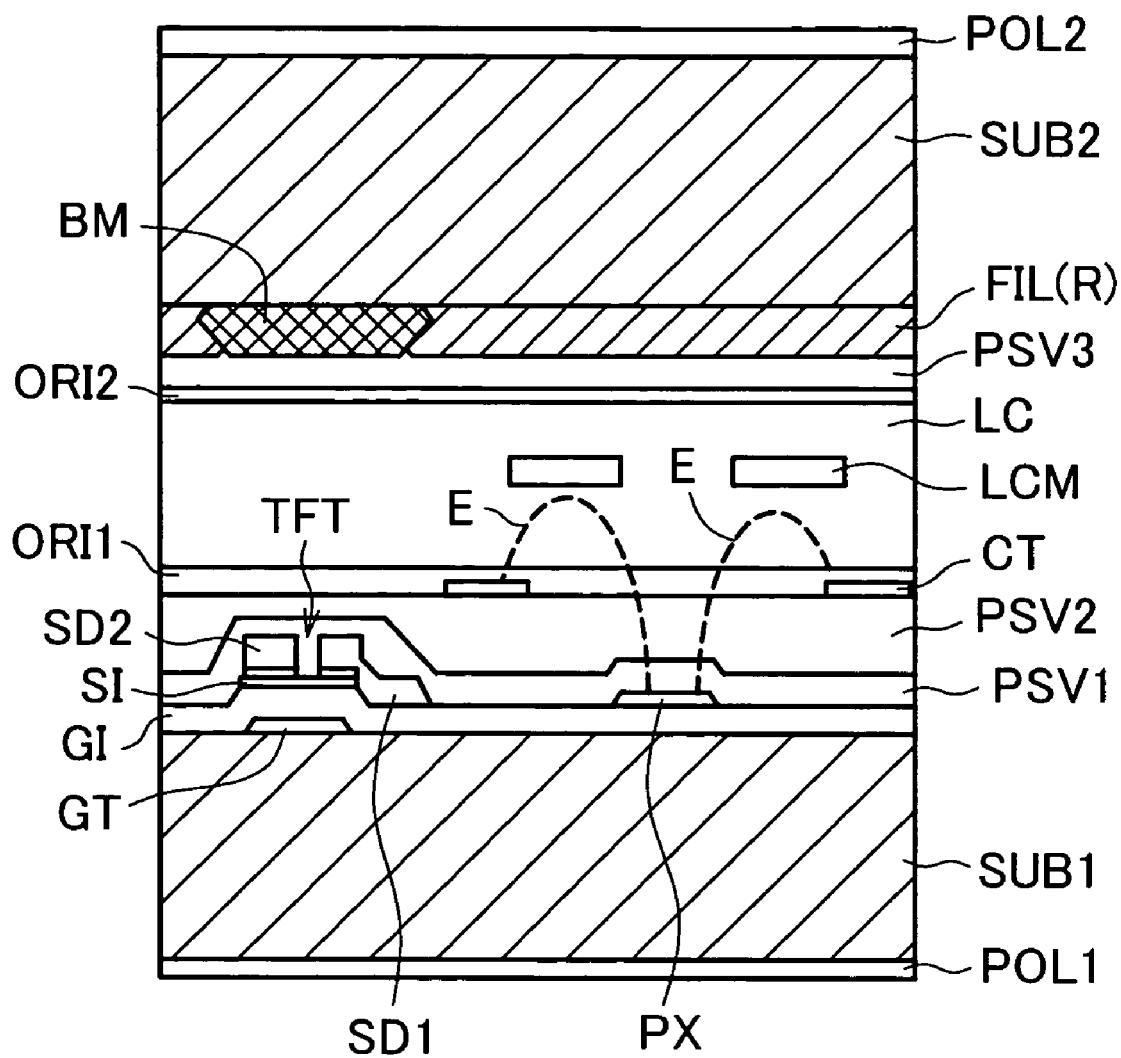
FIG. 13 is a diagrammatic cross-sectional view showing another example of the liquid crystal display device manufactured by the manufacturing method of the present invention.

FIG. 13 is a cross-sectional view of a representative part of another example of the liquid crystal display device manufactured by the manufacturing method of the present invention. This liquid crystal display device is an IPS method type of liquid crystal display device, wherein orientation films ORI1, ORI2 are applied to respective inner surfaces of a first substrate SUB1 having thin film transistors TFT and a second substrate SUB2 having color filter layers, and these orientation films ORI1, ORI2 are brought into contact with a liquid crystal layer LC.

The first substrate SUB1 includes gate electrodes GT of thin film transistors TFT, a gate insulation layer GI, silicon semiconductor layers SI, drain electrodes SD2, source electrodes SD1, and pixel electrodes PX, which are connected to the source electrodes SD1 and passivation layers PSV1, PSV2. Further, counter electrodes CT are formed on the passivation layer PSV2, and an orientation film ORI1 is applied to the substrate SUB1 such that the orientation film ORI1 covers the counter electrodes CT. Here, an orientation control performance is applied to the orientation film ORI1 due to the above-mentioned irradiation of the polarized light. Here, in FIG. 12, reference symbol LCM indicates liquid crystal molecules and reference symbol E indicates an electric field which controls the orientation direction of the liquid crystal molecules LCM. Electrode layers shown in FIG. 12, which constitute the respective electrodes, are omitted from the drawing.

On the other hand, to an inner surface of the second substrate SUB2, three. color filters FIL(R), FIL(G) and FIL(B) of three colors, which are defined by a light shielding layer BM, are applied. Over the color filters FIL(R), FIL(G) and FIL(B), a passivation layer PSV2 is formed. The orientation film ORI2 is applied to the second substrate SUB2 such that the orientation film ORI2 covers the passivation layer PSV2, and an orientation control performance is imparted to orientation film ORI2 due to the above-mentioned irradiation of the polarized light. Here, the color filters FIL (G), FIL(B) are not shown in the drawing. Further, on outer surfaces of the first substrate SUB1 and the second substrate SUB2, polarizers POL1, POL2 are stacked, respectively.

Here, the application of the present invention is not limited to a TN method type of liquid crystal display device and an IPS method type of liquid crystal display device. That is, the present invention is applicable to a method and a device for imparting a liquid crystal orientation control performance to orientation films in a single matrix method type of liquid crystal display device in the same manner.

As has been explained heretofore, according to the present invention, another polarized light which typically has not been used in the polarization treatment can be utilized for imparting a pretilt angle to the orientation film and for enhancing the characteristics of the orientation control performance. Further, since the present invention adopts a constitution which generates two polarized lights using a single light source device, the size of the whole manufacturing device can be reduced. Further, it is possible to impart an orientation control performance and a pretilt angle in one transporting movement of the substrate. Further, the imparting of the orientation control performance and the characteristics of the orientation control performance can be enhanced, whereby the treatment time of the orientation film can be largely shortened. Accordingly, it is possible to provide a polarized light irradiation method and a device which are extremely advantageous for obtaining a liquid crystal display device which can uniformly and effectively impart a highly accurate and defect-free orientation control performance to the orientation films, thus realizing highly reliable and high-quality image displays.

What is claimed is:

1. A method of manufacture of a liquid crystal display device, which includes an orientation film applied to a substrate surface which is brought into contact with a liquid crystal layer, and in which an orientation control performance and a pretilt angle are imparted to the orientation film, the method comprising the steps of:
    mounting a substrate to which the orientation film is applied on a stage which is sequentially transported to a main irradiation region and a sub irradiation region;
    generating two different kinds of polarized lights by performing polarization treatment of a light flux irradiated from one light source device;
    imparting an orientation control performance to the orientation film provided to the substrate which is transported to the main irradiation region by irradiating one of two different kinds of polarized lights to the orientation film; and
    transporting the substrate to the sub irradiation region and imparting a pretilt angle to the orientation film to which the orientation control performance is imparted by irradiating the other of the two different kinds of polarized lights to the orientation film.

2. A method of manufacture of a liquid crystal display device according to claim 1, wherein the light fluxes of said two different kinds of polarized lights are arranged in parallel to each other and the main irradiation region and the sub irradiation region are arranged at an interval which corresponds to a transport-direction width of the substrate; and
    at the time of irradiating the other polarized light of said two different kinds of polarized lights, a substrate surface of the substrate which is transported to the sub irradiation region is tilted with respect to the light flux of said another polarized light by an angle which corresponds to the pretilt angle.

3. A method of manufacture of a liquid crystal display device according to claim 1, wherein the main irradiation region and the sub irradiation region are arranged close to each other by the transport-direction width of the substrate;
    the substrate is sequentially transported to the main irradiation region and the sub irradiation region in a direction orthogonal to the light flux of the one polarized light of said two different kinds of polarized lights;
    the light flux of the other polarized light of said two different kinds of polarized lights is tilted with respect to the substrate by an angle corresponding to the pretilt angle in the sub irradiation region, and
    the irradiations of two different kinds of polarized lights are performed.

4. A manufacturing device for the fabrication of a liquid crystal display device which includes an orientation film applied to a substrate surface which is brought into contact with a liquid crystal layer and in which orientation control performance and a pretilt angle are imparted to the orientation film, wherein the manufacturing device includes:
    a stage on which a substrate having the orientation film formed thereon is mounted;
    a stage transport control device which controls a transporting of the stage and a tilting of a substrate surface of the substrate which is mounted on the stage; and
    a polarized light irradiation device which irradiates a given polarized light to the orientation film formed on the substrate which is mounted on the stage, wherein
    the polarized light irradiation device includes a main irradiation region where the orientation control performance is imparted to the orientation film formed on the substrate and a sub irradiation region where a pretilt angle is imparted to the orientation film to which the orientation control performance is imparted in parallel in the transporting direction of the stage;
    a single light source device;
    a polarization unit which takes out main polarized light and sub polarized light from light flux irradiated from the light source device;
    first irradiation means which irradiates the main polarized light taken out from the polarization unit to the orientation film formed on the substrate which is mounted on the stage and moves in the main irradiation region in the given direction thus imparting the orientation control performance to the orientation film; and
    second polarized light irradiation means which irradiates the sub polarized light taken out from the polarization unit to the orientation film formed on the substrate which is tilted with respect to the substrate surface of substrate which passes the main irradiation region and moves to the sub irradiation region by an angle which corresponds to the pretilt angle, wherein
    the orientation control performance and a given pretilt angle are imparted to the orientation film by allowing the substrate on which the orientation film is formed to pass through the main irradiation region and the sub irradiation region.

5. A manufacturing device according to claim 4, wherein the light source device includes a light source and a collimator lens which forms a light flux from the light source into parallel light along an optical axis of the light source, and the polarization unit includes:
   a large number of polarization elements which are sequentially arranged at a rear stage of the collimator lens along the optical axis of the collimator lens and are tilted with respect to a light flux irradiated from the collimator lens by a Brewster's angle, wherein one or a plurality of polarization elements arranged close to the collimator lens have reflection surfaces which reflect sub polarized light,
   a first wavelength changing filter which changes a wavelength of the main polarized light which passes through the polarization element,
   a reflection mirror which reflects the sub polarized light which is reflected on the polarization elements having the reflection surface in a direction substantially parallel to the main polarized light,
   a polarization direction changing wave plate which changes the polarization direction of the sub polarized light which is reflected on the reflection mirror, and
   a second wavelength changing filter which changes a wavelength of the sub polarized light which is reflected on the reflection mirror.

6. A manufacturing device for fabrication of a liquid crystal display device, which includes an orientation film applied to a substrate surface which is brought into contact with a liquid crystal layer and in which orientation control performance and a pretilt angle are imparted to the orientation film, the manufacturing device including:
   a stage on which a substrate having the orientation film formed thereon is mounted;
   a stage transport device which controls a transporting of the stage;
   a polarized light irradiation device which irradiates a given polarized light to the orientation film formed on the substrate which is mounted on the stage, wherein the polarized light irradiation device includes a main irradiation region where the orientation control performance is imparted to the orientation film formed on the substrate and a sub irradiation region where a pretilt angle is imparted to the orientation film to which the orientation control performance is imparted in parallel in the transporting direction of the stage;
   a single light source device;
   a polarization unit which takes out a main polarized light and a sub polarized light from a light flux which is irradiated from the light source device;
   first irradiation means which irradiates the main polarized light taken out from the polarization unit to the orientation film formed on the substrate which is mounted on the stage and moves in the main irradiation region in the given direction thus imparting the an orientation control performance to the orientation film; and
   second polarized light irradiation means which irradiates the sub polarized light taken out from the polarization unit to the orientation film formed on the substrate at an angle which corresponds to the pretilt angle with respect to the substrate surface of the substrate which passes through the main irradiation region and moves to the sub irradiation region, wherein
   the orientation control performance and a given pretilt angle are imparted to the orientation film by allowing the substrate on which the orientation film is formed to pass through the main irradiation region and the sub irradiation region.

7. A manufacturing device according to claim 6, wherein the light source device includes a light source and a collimator lens which forms light flux from the light source into parallel light along an optical axis of the light source, and the polarization unit includes:
   a large number of polarization elements which are sequentially arranged at a rear stage of the collimator lens along the optical axis of the collimator lens and are tilted with respect to light irradiated from the collimator lens by a Brewster's angle, wherein one or a plurality of polarization elements arranged close to the collimator lens have reflection surfaces which reflect the sub polarized light;
   a first wavelength changing filter which changes a wavelength of the main polarized light which passes through the polarization element;
   a reflection mirror which reflects the sub polarized light which is reflected on the polarization elements having the reflection surface toward the orientation film formed on the substrate at an angle which corresponds to the pretilt angle;
   a polarization direction changing wave plate which changes the polarization direction of the sub polarized light which is reflected on the reflection mirror; and
   a second wavelength changing filter which changes a wavelength of the sub polarized light which is reflected on the reflection mirror.

* * * * *